F. SNOW.
AUTOMATIC STOP MECHANISM.
APPLICATION FILED MAY 21, 1904.

912,042.

Patented Feb. 9, 1909.
4 SHEETS—SHEET 1.

Inventor:
Frederick Snow
By Hawley
Attorney

F. SNOW.
AUTOMATIC STOP MECHANISM.
APPLICATION FILED MAY 21, 1904.

912,042.

Patented Feb. 9, 1909.
4 SHEETS—SHEET 2.

Witnesses:

Inventor:
Frederick Snow
By C. P. Hawley
Attorney

F. SNOW.
AUTOMATIC STOP MECHANISM.
APPLICATION FILED MAY 21, 1904.

912,042.

Patented Feb. 9, 1909.
4 SHEETS—SHEET 4.

Inventor:
Frederick Snow

UNITED STATES PATENT OFFICE.

FREDERICK SNOW, OF CHICAGO, ILLINOIS, ASSIGNOR, BY MESNE ASSIGNMENTS, TO CONKLING COMPANY, OF CHICAGO, ILLINOIS, A CORPORATION OF ILLINOIS.

AUTOMATIC STOP MECHANISM.

No. 912,042.      Specification of Letters Patent.      Patented Feb. 9, 1909.

Application filed May 21, 1904. Serial No. 209,063.

*To all whom it may concern:*

Be it known that I, FREDERICK SNOW, of Chicago, Cook county, Illinois, have invented certain new, useful, and Improved Automatic Stop Mechanisms, of which the following is a specification.

My invention relates to automatic stop mechanisms and has special reference to a combined driving, reversing and stopping mechanism.

The object of my invention is to provide means whereby an alternatively operating machine element or member may be stopped at an exact point or position at any time.

The particular object of the invention is to provide an automatic stop mechanism especially adapted for use upon rotary washing machines; my purpose being to provide a mechanism that will cause the door of a washing machine cylinder to return to and stop before the door or opening in the washing machine shell. Because my invention is especially designed for machines of this character, and for the better understanding of the peculiar use, functions and operation of the mechanism, I will describe my invention in connection with and as having direct reference to rotary washing machines. Such a machine comprises a shell or tub to contain the washing fluid or suds, together with a rotary cylinder, in which the garments to be washed are placed, and a mechanism for rotatively alternating said cylinder. The washer shell is provided with a door in its upper part and the cylinder has a corresponding door in its side and both must be opened to either fill or empty the cylinder. The door in the cylinder can be opened only when it stands in front of the opening in the shell. The alternating or driving and reversing mechanisms commonly used on washing machines are automatic in operation and can be stopped at any time, but not at a particular point or in a given position. In other words, when the driving mechanism of a washer is stopped the washer cylinder will soon come to rest but when it has done so the door therein will rarely be found opposite the door in the shell, or where it can be easily reached. It is therefore, at such times, necessary for the operator to take hold of the cylinder, through the shell door, and turn the cylinder by hand until its door is brought into view and to the position where it may be raised through the opening in the shell. The work of turning the cylinder is laborious and requires time which the operator should not be compelled to expend; and the particular object of this present invention is to obviate waste of time and labor on this account.

Devices for locking the cylinder after it has been stopped are numerous, and in addition to these, various devices and mechanisms have been devised and proposed for stopping a moving washer cylinder in a certain position. These devices are classable under the general head of positive stopping and locking or buffing devices, comprising a dog or lever to enter the path of a moving part connected with the cylinder, when the driving mechanism is thrown out of gear. Such a device operates to abruptly stop the rotation of the heavy cylinder and subjects the whole machine to a severe shock and strain. It is for this reason that devices of the above character are not generally used. Each alternation of a washer cylinder usually comprises several revolutions thereof and this makes it difficult to apply a power actuated stopping device that will engage the cylinder at any point of its alternative movement and bring it back to the proper point, with respect to its door. This difficulty is further increased in the case of a machine so equipped that it may be caused to rotate once, twice or more times in each direction, the alternation thereof completely throwing out of time any stop mechanism that is governed according to the peripheral travel of the power pulley or pulleys of the driving mechanism.

I conceive that a washer cylinder, or any like heavy rotating part, should not be suddenly stopped, as by a block or buffer external to it, but that the regular driving and reversing mechanism should be utilized to forcibly cause the cylinder to alternate or oscillate within less than three hundred and sixty degrees and that by means of said mechanism the alternations should be caused to become more and more frequent and to diminish until the given point upon the cylinder is brought to rest in the desired position, which will correspond to the mean degree of oscillation. To accomplish this I find it necessary to abandon the mechanism that normally causes the periodical reversal of the cylinder or other working element and to go to the working element itself for the power necessary to actuate the shifter of the reversing mechanism. The advantage of so-doing is that as long as the cylinder possesses sufficient momentum to throw the shifter, the reversal of the cylinder will be accomplished and as the cylinder loses its momentum, through frequent reversals, it will fail to do more than free the shifter, at which time the cylinder will, obviously, be left at rest because it is disconnected from the driving mechanism. I so arrange the parts that the shifter, referred to, will be thrown and moved to its middle position when the door of the cylinder is opposite the door in the shell and thus the cylinder is made to stop at the proper point. To best utilize the momentum of the cylinder for the purpose of throwing or actuating the shifter, I directly connect said shifter and cylinder, for reciprocal operation as soon as the regular operation of the reversing mechanism is interrupted.

More specifically defined, my invention consists in an automatic stop mechanism associated with a reversing mechanism and which, at desired moments, is positively actuated by the movement of the cylinder, or other working member which is to be stopped. When said mechanism is so actuated, it causes repeated and positive operations of the driving and reversing mechanisms until the working element loses its momentum and stops through failure to complete an operation of the stop mechanism. In brief, I employ the working member as a means to positively apply the reversing mechanism thereto and so arrange the interposed stop device that, operated by said working member, it will cause more and more frequent reversals of said mechanism and corresponding diminishing alternations of the working member until said member finally reaches rest at a given position or point. And further, my invention consists in various constructions and combinations of parts, all as hereinafter described and particularly pointed out in the claims.

The invention will be more readily understood by reference to the accompanying drawings, forming a part of this specification, and in which.

In the drawings 2 represents a washer shell; 3, the washer cylinder; and, 4 the door of said cylinder showing through the opening, 5, in the shell, 2. The cylinder is provided with trunnions or gudgeons, 3', and is supported in the bearings, 6, on the ends of the washer shell. 7 represents the large gear wheel that is fixed on the outer end of the cylinder gudgeon and is used for rotating the same. The gear wheel, 7, may be assumed to represent the cylinder which is within the shell. It is operated by a rapidly rotating driver pinion, 8, which is a part of the driving and reversing mechanism. This driving and reversing mechanism is arranged upon the bracket, 9, which extends from the end of the washer shell. Said mechanism may be of any desired construction that is capable of imparting periodical alternate rotation to the driver pinion, 8, and the particular invention of this application is capable of employment with any of the well known forms of washing machine "headers" so-called, or reversing mechanisms. However, my invention is here shown in a special form adapted for conjoint use with a driving and reversing mechanism of my own invention and which I have proved to be reliable and exact in operation. Furthermore, the driving and reversing mechanism here shown is one which is capable of imparting to the cylinder alternations of various lengths and I deem it necessary to illustrate and describe this peculiar reversing mechanism in detail, to show how the automatic stop mechanism is coupled thereto, and in order that it may be fully understood that said automatic mechanism is operatively independent from the effects of the variable reversing or alternating mechanism and will take up its individual work and operation at any time without reference to the position in which the gear, 7, and the cylinder, 3, are left by said reversing mechanism, when disconnected therefrom.

The gist of my invention resides in a machine, of the class described, having a driving and reversing mechanism, that is governed, or controlled, by a self-timed, and preferably variably timed, shifter-motor, and which is further provided with a stop mechanism that is adapted to take the place of said shifter motor at any time, and by utilizing the power or momentum of the working member, cause a number of independent shifts or reverses of the driving mechanism. The regular or normal driving and reversing mechanism and this automatic stop or auxiliary reversing device are not intended to operate together at any given instant, but as will be seen hereinafter, each is adapted to take up the work of the other at any instant. The interchangeability of the mechanisms in this sense should be understood at once. The constructions thereof, the manner in which they are interchanged and the effect produced by each will now be explained.

It will be noted that the driving pinion is arranged on the shaft, 10, which is held in suitable bearings on the bracket, 9.

Figure 2:
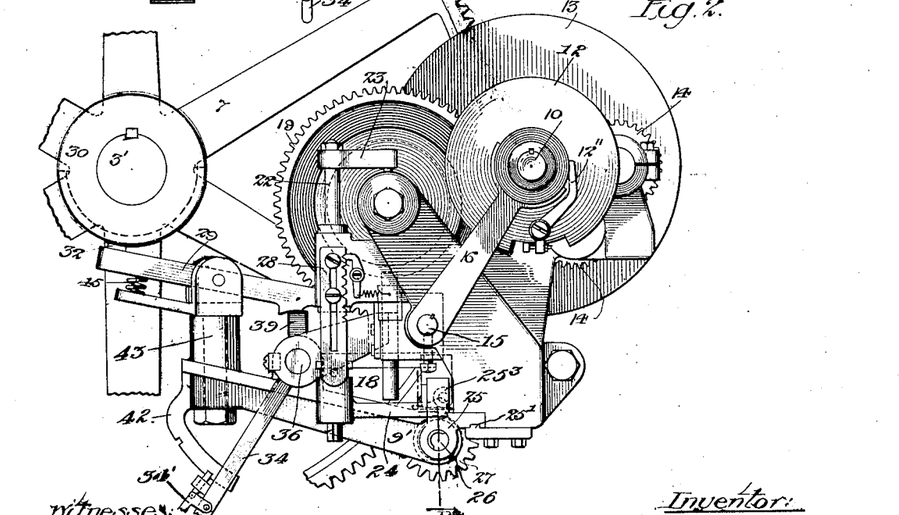
Fig. 2 is an end elevation thereof.

11 and 12 are two clutches that are continuously driven in opposite directions by a belt (not shown) on the power pulley, 13. The idler pinions, 14, 14, for communicating reverse rotation from pulley, 13, to clutch, 12, are shown in Fig. 2. Each clutch has a part that is fastened to the shaft, 10, and 10′, 11′, represent the clutch cones that are longitudinally movable to engage the arms, 11″, 12″ of the clutches. The cones are joined by, and constitute part of, the shifter comprising a shaft or rod, 15, and arms, 16, 16. The shifter rod, 15, is slidable in suitable bearings provided in the bracket, 9, and by operating the same longitudinally first one clutch and then the other may be thrown into action upon the shaft, 10, to rotate the driver, 8, and hence the large gear, 7, and the washer cylinder.

To obtain the best results the periodical operation of the shifter must be absolutely regular and exact. And to this end I associate with the mechanism thus far described an intermittent shifter motor or cam, which is periodically released by the rotation of the large gear wheel, 7. Each time the motor is released, a reversal of clutches occurs and hence a reversal of the gear wheel, 7, the motor releasing and timing mechanism immediately taking up the remeasurement of the gear wheel, 7, in the opposite direction.

17 represents the cam of the shifter motor referred to. This has an angular groove entered by a pin 18, which is joined to the shifter rod, 15.

Figure 1:
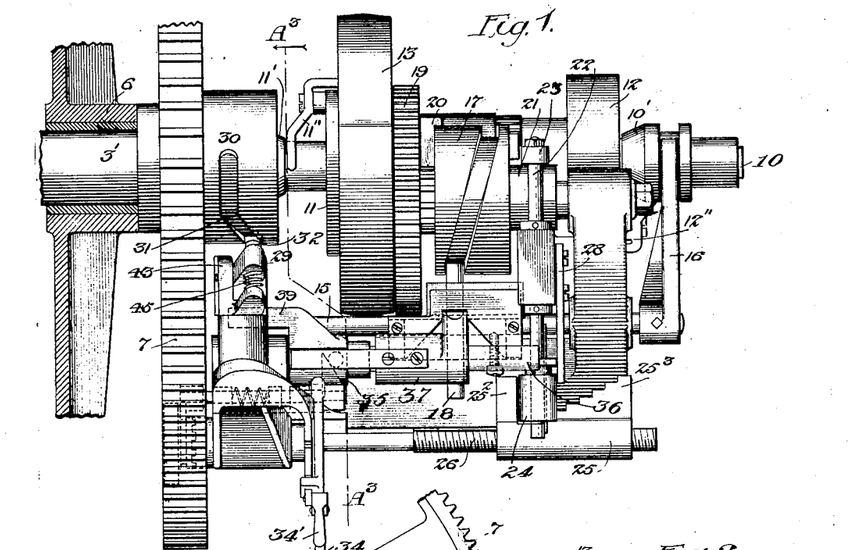
Figure 1 is a side elevation of an automatic stop mechanism embodying my invention.

19 is the motor actuating gear, which is preferably continuously driven from the power pulley, 13. A suitable connection, such as a chuck, 20, or a friction clutch is interposed between the gear, 19, and cam, 17, and tends to rotate said cam. A sliding sleeve, 21, known as a timing sleeve, normally prevents such rotation and the shifter, therefore, is normally held stationary, its pin being held in the groove of the cam. As the shifter-motor, so to speak, has a constant tendency to rotate and as the sleeve t, alone interferes with such rotation, it is only necessary to provide means for moving said sleeve at regular intervals in order that the shifter may be powerfully actuated by the motor, 17. For this purpose, I use a vertical rocking shaft, 22, having an arm, 23, engaging a groove in the sleeve, 21, and having another arm, 24, at its lower end to be engaged by a longitudinally traveling block, 25, that is slowly reciprocated by a screw shaft, 26, which is driven first in one direction and then the other by the large gear, 7, being connected therewith by a pinion, 27. The block, 25, is slidable in suitable guides, 25′, on the bottom of the bracket and its longitudinal motion, as will be obvious, is determined by the extent of the rotation of the gear or working element, 7. This, in turn, is determined by the intervals of non-engagement between the block, 25 and the arm, 24, said arm being arranged between opposite lugs, 25² and 25³ on said block. When the block does engage the arm, it continues to move long enough to throw said arm to one side, which rocks the shaft, 22, and arm, 23 and slides the sleeve, 21, to liberate the motor, whereupon the clutches will be changed and the movement of the gear wheel will be reversed. At the same instant, the timing block, 25, will begin its return movement and after a considerable period, during which the gear wheel, 7, will have been permitted a certain peripheral travel, the opposite lug of the block will engage and move the arm, 24, to again trip or release the motor and cause another reversal. The advantage of this mechanism is, that it positively measures the peripheral travel of the gear wheel, 7, and washer cylinder, and times the shifter according to such travel, making the alternations of the cylinder exactly equal. The best results from the cylinder can only be secured when this is the case. Inasmuch as the width of the gap between the lugs on the block, 25, determines the duration of the alternate movements of the mechanism, it is a simple matter to, at this point, provide means to either increase or decrease the peripheral travel of the gear wheel, 7. I accomplish this by making the arm, 24, vertically adjustable on the shaft, 22, and providing a number of steps in one of the lugs on the block, 25, as shown in Fig. 1. At its lowest point the arm, 24, engages with the block frequently, while at higher points the frequency of engagements is lessened, thereby permitting the driving mechanism to turn the gear wheel, 7, further, before it is reversed, by the action of the block through the medium of the shifter motor.

28, in Fig. 2, represents a manually adjustable device for holding the arm, 24, at different elevations. This device may be raised at any time when the gear, 7, is running or when the parts are stationary and may be lowered whenever the stepped lug does not interfere with its being dropped.

The regularly, though variably, controlled driving and reversing mechanism exerts power upon the gear, 7, to rotate the same and the heavy cylinder. All its members are positively driven and caused to act by the power pulley, 13. In contradistinction, the automatic stop mechanism is not directly within the influence of said power pulley but is operated from and by the cylinder itself. At desired times it takes over the control of the reversing mechanism and hence of the action of the power pulley upon the rotating cylinder. The automatic stop mechanism or auxiliary reversing or shifting mechanism, considered alone, comprises a simple lever, 29, and a single throw cam, 30, the latter being, preferably, arranged upon the cylinder shaft or gudgeon, while the lever, 29, is pivoted upon an extension, 9', of the bracket, and is pivotally joined to the shifter; i. e., the rod, 15, the arm, 16, and sliding cones. The lever is preferably adapted to swing in a horizontal plane. The cam, 30, is provided with a cam groove, having an angular or cam surface, 31, and the lever, 29, has a pin, 32, to enter the cam groove. The off-set, or angular portions of the cam, are positioned with reference to the position of the pin, 32, and the doors in the washer cylinder and shell. In other words, the position of the cam on the cylinder gudgeon is such that when the shifter pin, 32, is taken into the angular part of the groove, the cylinder door will at that instant be exactly opposite the door in the washer shell. I arrange the parts so that when the pin is in this middle position, the clutch shifter, to which the lever is connected, will occupy a middle position with respect to the clutches of the reversing mechanism and both clutches will be disengaged from the driving shaft. The cam groove, 31, may extend entirely around the cam wheel, 30, or only part way, as shown in the drawings.

33, represents the pivotal connection between the lever, 29, and the clutch shifter 16. This connection is permanent.

Disregarding the main or normal reversing mechanism, for the moment, it will be seen that when the cam, 30, and lever, 29, are connected, said lever and the shifter will be operated or thrown every time the cylinder door passes the door or opening in the washer shell. It is obvious, also, that the movement of the lever and shifter is occasioned by the rotation of said cylinder and that the same will operate the shifting lever and alternate the clutches only so long as the momentum of the cylinder is sufficient to drive the pin 32 through or across the angular portion of the cam groove, 31. A few reversals of the cylinder reduce its momentum to such extent that the slight resistance of the clutches and connected parts acting upon the cam, 30, through the pin, 32, will stop the cylinder; the same failing of sufficient force to couple either of the clutches to the driving shaft. Now, as the clutches are both free, only when the lever pin, 32, occupies a middle position in the cam, it is obvious that the cylinder door will have been stopped in the desired position, opposite the shell door. To bring the secondary or auxiliary shifter mechanism into play, it must be connected with the cam on the cylinder or working element, but it is first necessary to disconnect the regular or normal shifter operating mechanism, to-wit: the shifter motor; as the two shifting mechanisms work in different ways and times, not in harmony. In an operative sense, it is necessary to disconnect one shifter operating mechanism whenever the other is used, and to this end I provide means for disengaging the shifter motor pin, 18, from the shifter rod, 15, when the lever, 29, is coupled to the stop cam, 30, and vice versa, employ means to disengage the lever, 29, and the stop cam, 30, when the shifter motor, 17, and the clutch shifter are coupled together. Furthermore, the timing block, 25, plays no part in the automatic stop mechanism and I therefore provide means for disconnecting said block from the working gear, 7, in advance of the engagement of the lever, 29, with the stop cam, 30, on said gear. If this was not done, the timing block, 25, would not be found in the proper position when the regular reversing mechanism was next operated. It is desirable that these connections and disconnections should be brought about by a single movement of a hand lever. The structures that I preferably use in carrying out these parts of my invention are clearly shown in the drawings. 34, is the hand lever referred to. The lever is a part of the sleeve, 35, mounted on a stud shaft, 36, that extends from the bracket part, 9'.

37, is a movable extension of the sleeve, 35, being joined thereto by telescoping connection, 38.

39, 40, and 41 are arms extending in three directions from the lever operated sleeve, 35.

42, is a quadrant upon which lever, 34, may be fastened in either position, by the lock, 34'.

Figure 3:
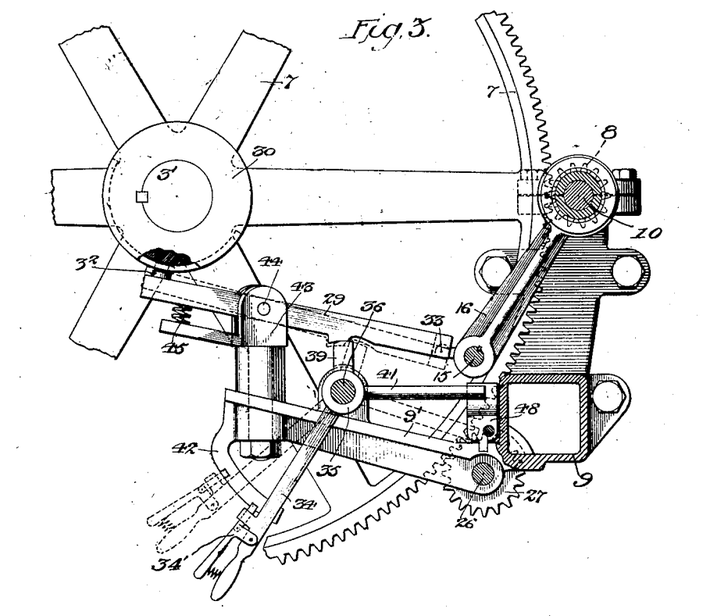
Fig. 3, is a vertical section on the line, A³—A³ of Fig. 1.
Figure 4:
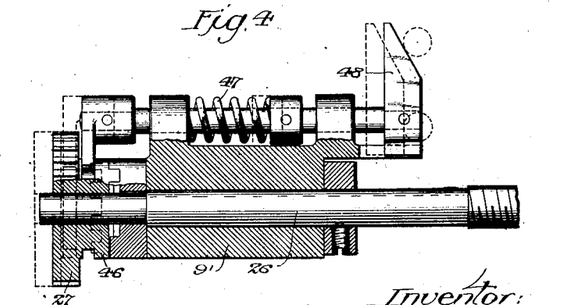
Fig. 4, is an enlarged detailed section on the line B⁴ of Fig. 2.

43 is the vertical pivot of the lever, 29, and said lever is pivoted therein on a horizontal pin, 44. This permits the vertical movement of the lever and the cam pin, 32. Said pin is normally pressed against the cam, 30, by gravity of the long arm of the lever and by the spring, 45. The connection, 33, between the lever, 29, and the shifter is such as to permit the vertical movement of the lever. This vertical movement is brought about by the engagement of the arm, 39, on sleeve, 35, with the lever, as shown in Figs. 1, 2, and 3. When the outer end of the lever is lifted by the depression of the hand lever, 34, and elevation of arm, 39, the pin, 32, is disengaged from the stop cam, 30, and this is the normal position of the parts during the time that the regular reversing mechanism is in operation.

46, represents a clutch that is arranged between the timing shaft, 26, and its pinion, 27. This clutch is normally closed by a spring-pressed device, 47, on the arm 9' of the bracket 9.

48 is a beveled block, which is a part of this device and when the hand lever, 34, is raised, the arm 41, thereof, strikes the block, 48, and throws it to one side thereby opening or disengaging the clutch, 46, so that the pinion, 27, may thereafter operate with the main gear, 7, without rotating the timing shaft, 26, or moving block, 25.

The mechanisms remaining to be described are those which are used for coupling and uncoupling the shifter motor, 17.

Referring to Figs. 1 and 8 to 11, it will be seen that the pin, 18, is fastened in a small block, 49, which is slidably held in a larger block, 50, that is fixed on the shifter rod, 15. When the two blocks are fastened together the rotation of the cam, 17, will operate the main clutch shifter; at other times the pin and the block, 49, will remain stationary and the shifter may be moved independently. The arm, 40, is the device which I use for fastening the two blocks, 49 and 50 together. The end of the arm, 40, is slotted to receive the lower end of the cam pin, 18. The pin and arm are always engaged and the arm being slidable on the stud shaft, 36, may and does follow the movement of the pin by the cam, 17. The block, 50, is provided with a notch or recess, 51, to receive the arm, 40, when raised by the depression of the hand lever, 34, and when the arm is in the notch, 51, it positively locks the blocks 49 and 50 together, thus enabling the movement of the shifter with the block, 49. When the arm, 40, is dropped out of the notch, by the lifting of hand lever, 34, the blocks 49 and 50 will be disconnected. It will be noted that the face plate of the block, 50, is provided with beveled or inclined edges 52—52, leading to the notch, 51. These, with the arm, 40, constitute the justifying device before referred to, the office thereof, being to return the shifter from the middle position in which it is left by the automatic stop mechanism to the proper position and relation with respect to the cam 17, and pin, 18, when it is desired to start the regular driving and reversing mechanism. It will be noted that when the hand lever, 34, is in its lowest position, the blocks 49 and 50 are connected by the arm, 40;—the timing shaft, 26, and the pinion, 27, are connected by the clutch, 46, the wedge-block, 48, being then free from the arm, 41; and, the automatic stop-lever, 29, is free from the stop cam, 30, having been elevated by the arm, 39.

Figure 5:
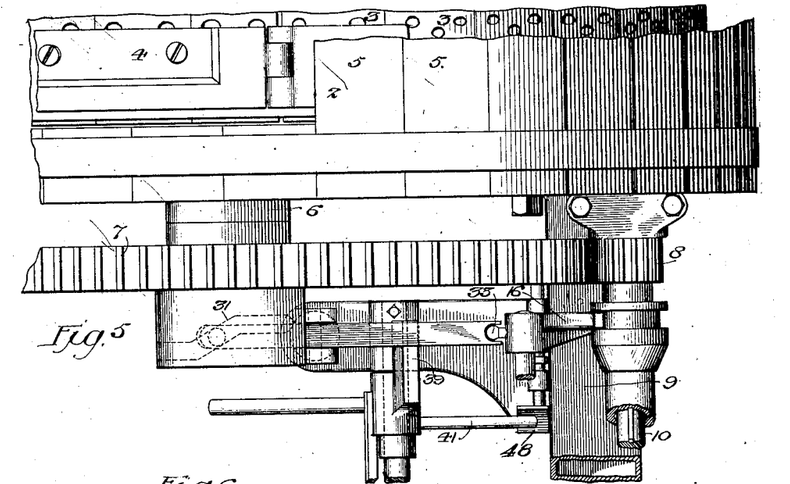
Fig. 5, is a plan view of the stop mechanism, showing the parts in positions of rest or at centers.
Figure 6:
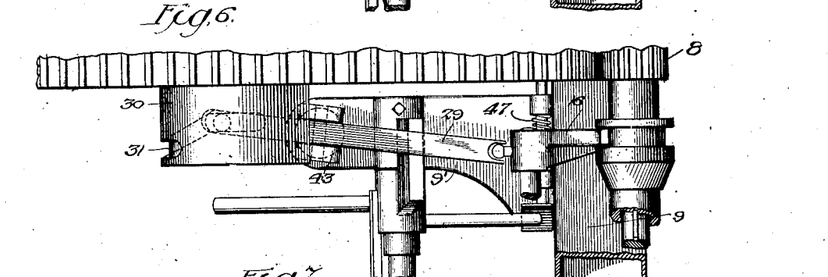
Figs. 6 and 7 are similar views, illustrating the extreme movements of the stop or automatic shifting mechanism.
Figure 7:
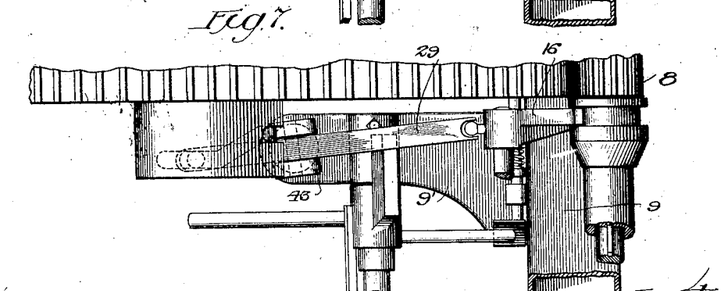
Figures 8, 11, 12:
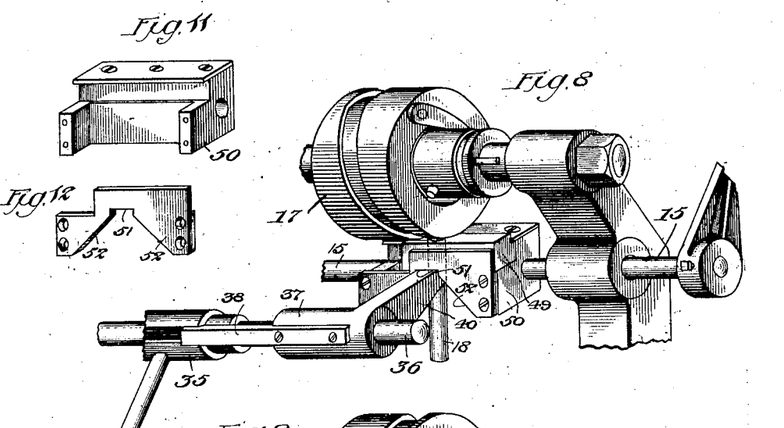
Fig. 8 is a perspective view, illustrating the connection between the regular or normal and the auxiliary shifting devices.
Figs. 11, 12 and 13 are perspective details of the shifter-justifying block.
Figures 9, 10, 13:
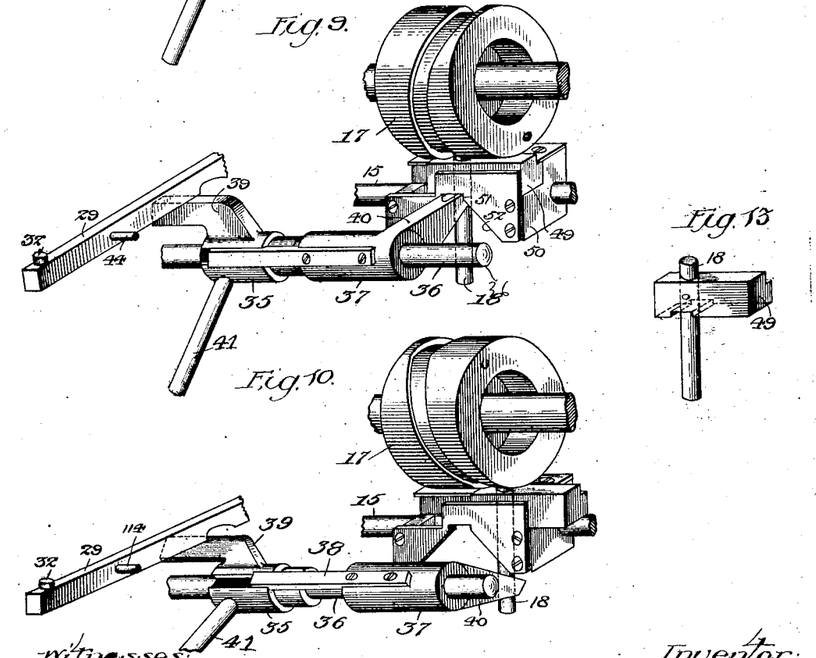
Fig. 9 is a similar view, showing the parts in the opposite extreme position.
Fig. 10, is still another perspective view, showing the parts as they appear when the automatic stop mechanism is in action.

The operation of the regular or normal driving and reversing mechanism will be understood from the foregoing description, but a full understanding of my automatic stop mechanism, and the means which renders the same operative in connection with the normal mechanism, will be facilitated by a summarization of the several parts, functions and operations. As explained the automatic stop lever, 29, is normally disengaged from the stop cam, 30, but as it is permanently connected with the shifter of the reversing mechanism, it will swing back and forth therewith. The lever is so proportioned that the pin, 32, is always within the lateral area of the cam groove, 31, in cam, 30. Hence, it will quickly enter said groove when the hand lever, 34, is lifted to disengage the arm, 39, from said lever, 29. Meantime, the lifting of hand lever, 34, will have disengaged the timing clutch, 46, through medium of arm, 41, and wedge-block, 48, and will have disengaged the cam pin, 18, from the shifter, 15, by dropping the arm, 40, as shown in Fig. 10. At the moment the pin, 32, enters the cam groove, 31, the cam being in rotation will quickly drive the pin to one side or the other, thereby throwing the main clutch shifter and causing a reversal of the gear, 7, and the washer cylinder. This also reverses the cam, 30, and the pin, 32, still remaining within the groove thereof, will be almost instantly driven in the opposite direction. Such movement of the pin, 32 and lever, 29, will cause a return movement and reversal of the shifter and the gear, 7 and so on, the reversals becoming more and more frequent until at last the momentum of the cylinder is insufficient to do more than disengage the main clutch, leaving the pin, 32, midway of the angular portion of the cam groove, 31. As both main clutches are disengaged at this time there is no force present to rotate the gear, 7, and the latter, with the washer cylinder, will stand still. As before explained the relations of the stop pin, 32, and the angle of the cam groove, correspond, respectively, to the positions and relation of the door in the washer shell and the door in the cylinder, so that when the pin and cam are in the positions shown in Fig. 5, the cylinder door will be exactly opposite the door opening of the shell. The cylinder door may then be opened. It will be evident that, should the cylinder be turned by hand at this time, the only effect would be to rotate the cam, 30, and throw the pin, 32. This would cause movement of the shifter and the coupling of the clutch to drive shaft 10, which would bring said shaft into forcible operation to return the cylinder door to its proper position against the hand force exerted upon the cylinder. Danger to the operator is thus wholly avoided, as it is impossible to start the normal reversing mechanism into action by any force exerted on the cylinder by the operator. To start the machine into regular action, it is only necessary to depress the hand lever, 34. This movement raises the several arms, 39, 40 and 41. The arm, 39, lifts the lever, 29, and disengages it from the stop cam, 30. At the same time, the arm, 41, is lifted away from the wedged-block, 48, permitting the spring of the latter to join the members of the chuck or clutch, 46, thereby connecting the timing or measuring pinion, 27, with the timing shaft and block, 26, 25. The timing mechanism is thus prepared to measure the movement of the gear, 7, before said gear starts into motion. Simultaneously with the movement of the other arm, the arm, 40, is raised into contact with one or the other of the inclined edges, or surfaces, 52, of the block, 50. The continued movement of the arm, 40, operates to wedge the block, 50, to one side and as the cam pin, 18, is fixed at one of the extreme positions of the shifter cam, 17, it is obvious that the wedging over of the block, 50, by the arm, 40, will result in forcing home the movable cone of the corresponding clutch on the driving shaft, 10. The arm finally enters the notch, 51, in the block, 50, thereby connecting the two blocks, 49 and 50. The moment the shifter, 15, is thrown by the justifying device, herein described, the driving shaft will be set into rotation, thereby starting the large gear, 7. Meantime the timing mechanism, having been connected with said gear, 7, will have its proper relation to the shifter motor trip and will soon cause the reversal of the driving gear, 7, whereupon the normal operation will be taken up. If at any time it is necessary to stop the washing machine cylinder, the hand lever, 34, is raised to disconnect the shifter, blocks 49 and 50 and the clutch, 46, whereupon the cam, 30 and the lever, 29, will take over the control of the reversing mechanism.

It is obvious that numerous modifications of my invention will readily present themselves to one skilled in the art, and I therefore do not confine my invention to the specific constructions herein shown and described.

Having thus described my invention, I claim as new and desire to secure by Letters Patent:

1. In an automatic stop mechanism, a working element, in combination with driving means for rotating said element alternately, a stop cam attached to said element and means for causing operations of said automatic driving means from the movement of said cam by said element, substantially as described.

2. In a mechanism of the class described, a working element capable of alternations exceeding complete revolutions and having a part to be stopped at a certain point, in combination with a suitably timed alternating mechanism and means for arbitrarily actuating the same from said element, said means including a cam on and revoluble with said element and which is positioned thereon with relation to the stopping point of said element, substantially as described.

3. In a mechanism of the class described, an element for alternate rotation, in combination with a driving and reversing mechanism for positively and regularly alternating said element and means adapted to be directly connected with and actuated by said element, for arbitrarily operating said driving and reversing mechanism, to stop said element at a certain point, substantially as described.

4. In a mechanism of the class described, a working element for alternate rotation, in combination with a driving and reversing mechanism adapted to positively and regularly alternate said element, a stop cam upon said element and means adapted for connection therewith and when so connected adapted to arbitrarily operate said reversing mechanism to stop said element by diminishing alternations, substantially as described.

5. In a mechanism of the class described, an element for alternate rotation, in combination with normal driving and reversing mechanism therefor, a stop cam on said element and a mechanism for coöperation with said cam to cause arbitrary and diminishing alternations of said element, as and for the purpose specified.

6. In a mechanism of the class described, a member for alternate rotation and to be stopped in a given position, in combination with a driving and reversing mechanism, including a shifter, normal actuating means for said shifter, a stop cam on said element and means for throwing out of action the normal shifter mechanism and operating said shifter from said cam, substantially as described.

7. In a mechanism of the class described, an element for alternate rotation, in combination with a driving shaft coupled thereto, clutches for rotating said shaft in opposite directions, a clutch shifter, a shifter motor, means for connecting said motor to and disconnecting it from said shifter, a motor timing mechanism, means for connecting said timing mechanism to and disconnecting it from said element, an automatic stop mechanism and means for connecting the same to and disconnecting it from said element, substantially as described.

8. In a mechanism of the class described, a working element, in combination with driving and reversing mechanism, including a shifter, an intermittently operable shifter motor, mechanism whereby the operation of said motor is timed and governed by said element, an automatic stop device, alternated with said element, and reversing means actuated thereby when the normal operation of the timing and governing mechanism is interrupted, substantially as described.

9. In a mechanism of the class described, an element for alternate rotation and to be stopped at a certain point, in combination with regularly timed driving and reversing mechanisms therefor, including a shifter, a stop cam provided on said element and means for interrupting the normal action of said reversing mechanism and connecting said shifter to said cam at will, substantially as and for the purpose specified.

10. In a mechanism of the class described, a working element, in combination with driving and reversing mechanisms therefor, including a shifter, a stop cam provided on and revoluble with said element, and means to engage said cam and arbitrarily operate said shifter from the motion of said element, to stop said element, substantially as described.

11. In a mechanism of the class described, an element for alternate rotation, in combination with driving and reversing clutches suitably coupled thereto, a shifter for said clutches, a shifter-motor, a timing device, coupling and justifying blocks, means for joining said blocks and an automatic stop device simultaneously operable with said means, substantially as described.

12. In a mechanism of the class described, a working element, in combination with a stop cam thereon, and positioned with relation to a certain point on said element, a driving and reversing mechanism, including a shifter, means for periodically operating said shifter, a shifter diconnecting device adapted to permit the arbitrary operation of said shifter, means for connecting said cam and shifter at such times, and a justifier for restoring the relations between the shifter and the means for periodically operating the same, substantially as described.

13. In a mechanism of the class described, an element for alternate rotation, in combination with driving and reversing means coupled thereto and including a shifter, a shifter-motor normally coupled to said shifter, an uncoupling and justifying device, a motor-timing mechanism, means for coupling the same to said element, a cam on said element, means for connecting said cam and shifter and a single hand lever for operating said means, said justifier and said couplings, substantially as described.

14. In a mechanism of the class described, a working element for alternate rotation and to be stopped at a given point, in combination with a cam on said element, set with relation to the stopping point thereof, a driving and reversing mechanism, including a normally, periodically operated shifter, means for joining said shifter and cam whereby said shifter is several times positively operated and finally left at mid position and means for thereafter restoring said shifter to one of its set positions, to continue the normal alternations of said element, substantially as described.

15. In a mechanism of the class described, a working element, for alternate rotation, in combination with periodically timed reversing mechanism therefor, a single throw stop cam fixed on said element, and means for interrupting the regular operation of said mechanism and for connecting said stop cam therewith to determine the stopping point of said element, substantially as described.

In testimony whereof, I have hereunto set my hand this 11th day of May, A. D. 1904, at Chicago, Illinois, in the presence of two witnesses.

FREDERICK SNOW.

Witnesses:
C. G. HAWLEY,
JOHN R. LEFEVRE.